UNITED STATES PATENT OFFICE.

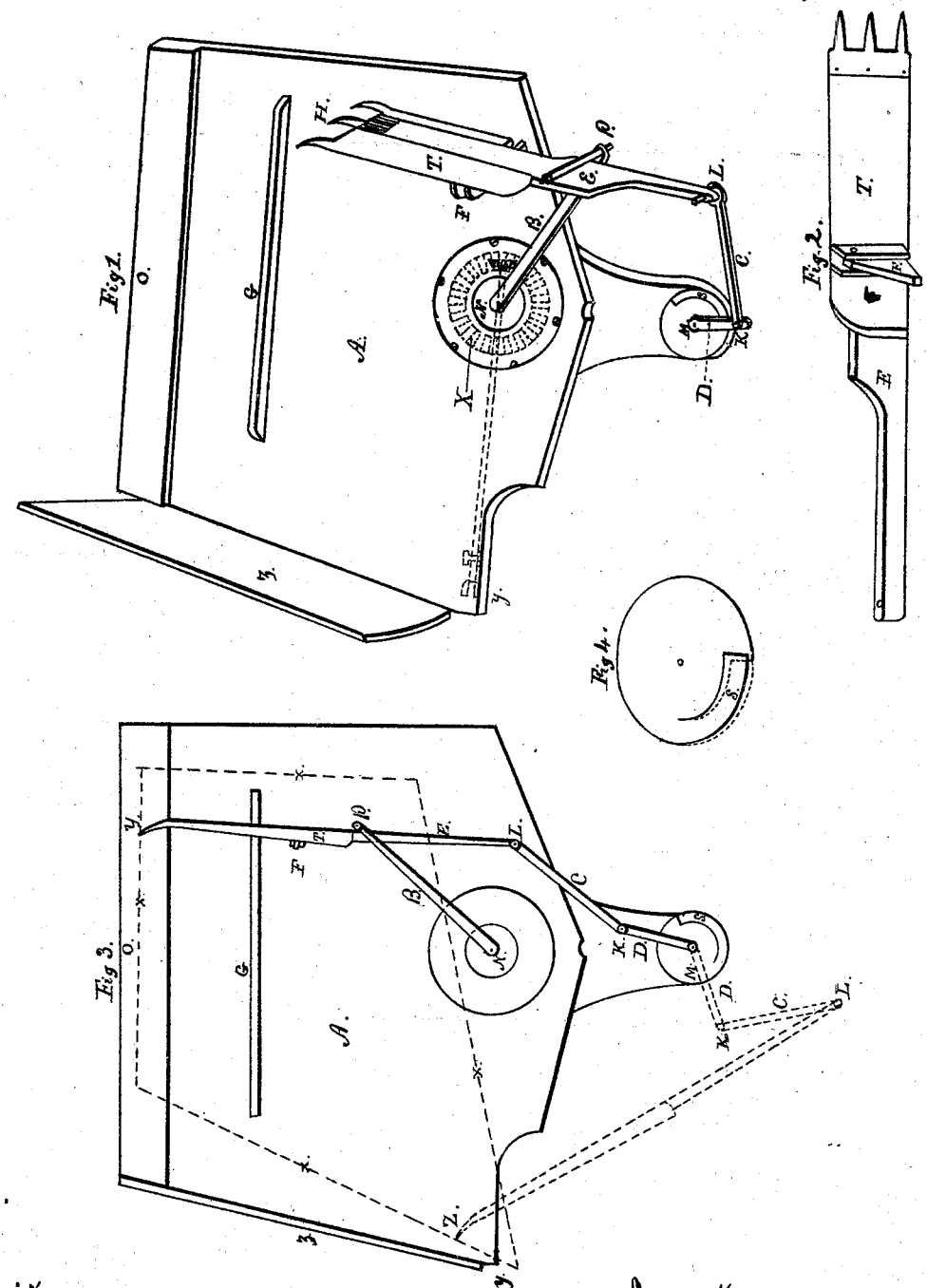

ROBERT BROWN, OF DAYTON, AND ABEL HOOVER, OF MIAMISBURG, OHIO.

IMPROVEMENT IN ROTATING SLIDING RAKES FOR HARVESTERS.

Specification forming part of Letters Patent No. 169,951, dated November 16, 1875; application filed February 19, 1875.

*To all whom it may concern:*

Be it known that we, ROBERT BROWN, of the city of Dayton, county of Montgomery and State of Ohio, and ABEL HOOVER, of the town of Miamisburg, county of Montgomery and State of Ohio, have invented a new and useful Automatic Sliding Gathering-Rake for Mowing and Reaping Machines; and we do hereby declare the following to be a full, clear, and precise description of the same, reference being had to the accompanying drawings, forming part of this specification, in which—

Figure 1 represents a perspective view of as much of the machine as will illustrate our invention. Figs. 2, 3, and 4 represent a plan view of the platform with the rake in different positions, and detailed parts of the machine, which will hereafter be more particularly referred to.

Similar letters of reference in the accompanying drawings denote the same parts.

Our invention consists in attaching to the platform of harvesters an automatic sliding gathering-rake, deriving its motion from a radial arm revolving about a fixed center, and guided in its course by a radial arm having a fixed center, and a fixed guard on the face of the platform.

In the accompanying drawings, A represents the platform upon which the rake works. B is a radial arm, which is connected by a hinged joint, P, to the fixed part of the rake, and at the other extremity is connected with the stud N, which is fixed to the bevel cog-wheel X, deriving its motion from a shaft with bevel-gear. D is a radial arm revolving about a fixed pivot, M, and connected by a hinged joint, K, to the connecting-arm C, which connecting-arm is attached to the fixed part of the rake by a hinged joint, L. H is the extremity of the teeth of the rake. F is a shoulder fixed upon the rake E. T represents that part of the rake E having a groove on one side, into which the arm of the rake fits in such a manner as to allow the rake to be shortened by the shoulder F coming in contact with and sliding along the guard-piece G during the transit of the rake-teeth from the point H in Fig. 1 to the point Z in Fig. 3, so that the teeth of the rake E are prevented from projecting over the outer line of the cutter-bar o.

The movable part of the rake T and the fixed part E are so connected by a spring as to cause the rake to assume its elongated and normal condition as soon as the shoulder F has passed the guard G. The rake derives its motion from the radial arm B, and is so restrained in its motion by the radial arm D and connecting-arm C as to travel from the point H in Fig. 1 to the points Y and Z, as shown in Fig. 3, the extremity of the teeth traveling in a path marked by the dotted line $x$, (shown in Fig. 3,) by which motion of the rake the grain is gathered from the point H in Fig. 1, formed into a compact bundle or sheaf against the platform side $z$, and finally discharged from the platform at the point $y$.

The restraining-arm D is centered upon a spring-plate of peculiar construction, which I term a check-spring cam, S, the same being simply a plate with a spring-incline upon its periphery, over which the arm D must pass when the rake and connecting-arm are straightened into line and drawn forward by the tractive force of the arm B, the arm D forcing the spring down as it passes, the spring, however, acting as a restraint upon the rake, causing it to swing round to the front until the arm B forces the arm D to pass, which does not occur until the rake is swung round as desired.

Having thus fully described our invention, what we claim, and desire to secure by Letters Patent of the United States, is—

The rotating sliding rake consisting of a fixed part, E, and a movable part, F, in combination with the radial arm B, actuated by a bevel-gear, X, the controlling radial arm D, connecting-arm C, and check-spring cam S, substantially as described.

ROBERT BROWN.
ABEL HOOVER.

Witnesses:
O. DORSEY BROWN,
J. S. BINKERD.